3,453,074
NOVEL PHOSPHOROUS COMPOSITIONS
AND PROCESS
William R. Mustian, Jr., Lakeland, Fla., assignor to Occidental Research & Engineering Limited, London, England, a British company
Filed Apr. 22, 1965, Ser. No. 450,011
Int. Cl. C01b 25/18
U.S. Cl. 23—165          6 Claims

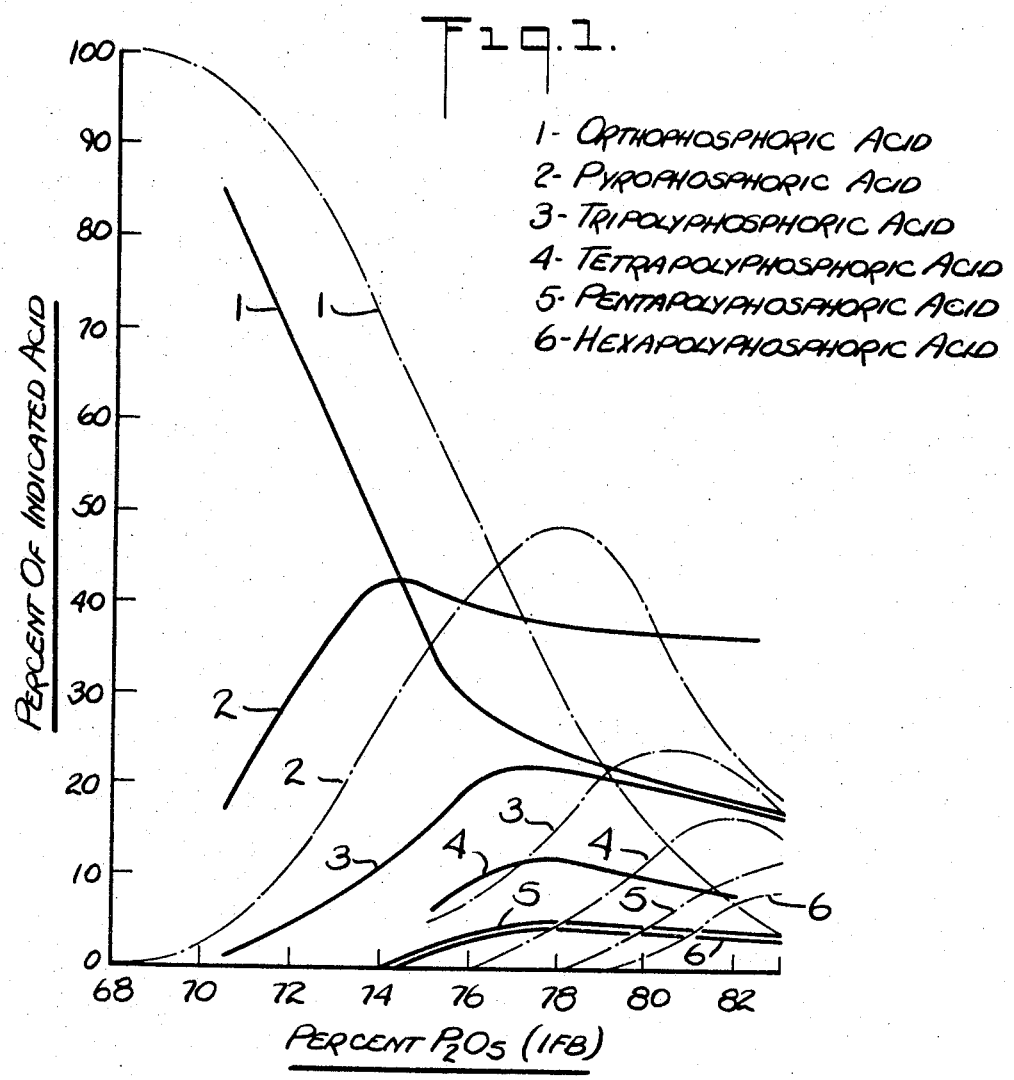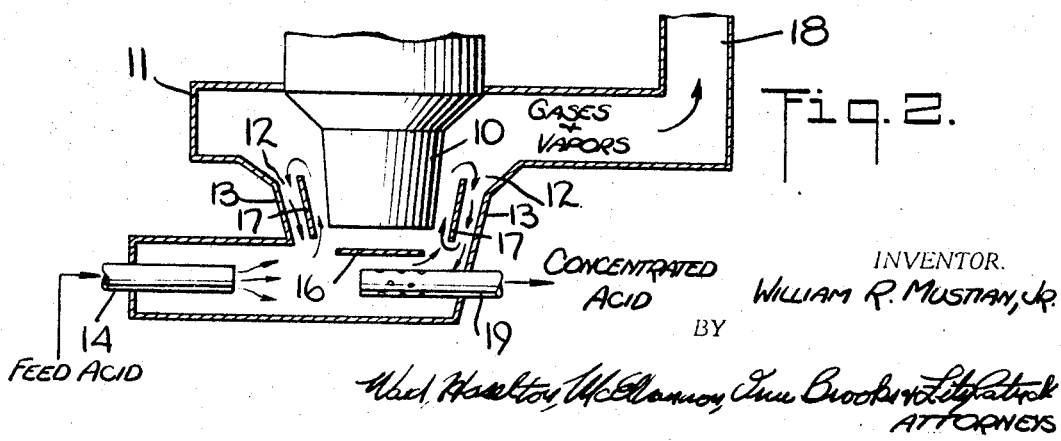

ABSTRACT OF THE DISCLOSURE

A liquid phosphoric acid containing 72–79% $P_2O_5$ on an impurity free basis, 22–65% of the $P_2O_5$ being in the form of orthophosphoric acid and not more than 44% in the form of pyrophosphoric acid, the percentage of $P_2O_5$ in the form of tripolyphosphoric acid being not less than a stated quantity.

---

This invention relates to novel phosphorus compositions and processes therefor, and more specifically, it relates to novel phosphoric acid compositions and the methods for preparing them.

As is well known in the art, when phosphoric acid becomes increasingly concentrated it appears in new forms. Phosphoric acid can be considered to be a mixture of water and phosphorus pentoxide. As a convenient classification in the art, phosphoric acids have been divided into low-$P_2O_5$ content acids which contain less than about 68% $P_2O_5$, and superphosphoric acids which have a $P_2O_5$ content above about 68%. All of the foregoing percentages are by weight, and all parts, proportions, and percentages herein are by weight, unless otherwise indicated. All percentages relating to $P_2O_5$ content are on an impurity-free basis (IFB), that is, calculated on the basis of only the water and $P_2O_5$ and ignoring any amounts of any impurities which may be present. Since wet-process acids contain materials other than $P_2O_5$ and $H_2O$, it is necessary when comparing the distribution of the several phosphoric acids therein with pure or electric furnace phosphoric acids and for other purposes to consider the wet-process acids on an impurity-free basis.

As the ratio $H_2O/P_2O_5$ decreases and the $P_2O_5$ content of the acid increases, the chemical composition and properties of the mixture change. At low $P_2O_5$ contents, the phosphoric acid exists in the form of $H_3PO_4$, commonly known as orthophosphoric acid. As the $P_2O_5$ concentration increases, pyrophosphoric acid, $H_4P_2O_7$ is formed. This reaction is regarded as the condensation of two units of phosphoric acid with the elimination of a water molecule, thus:

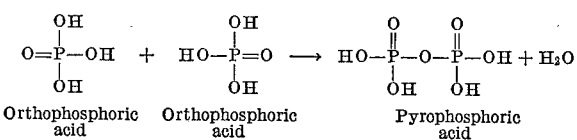

A molecule of pyrophosphoric acid can condense with another molecule of orthophosphoric acid to produce a polyphosphoric acid, specifically tripolyphosphoric acid, $H_5P_3O_{10}$, thus:

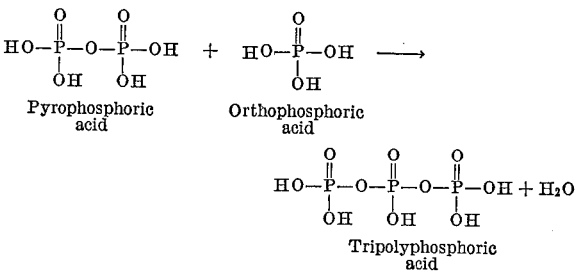

This condensation of orthophosphoric molecules can continue to produce tetrapolyphosphoric acid, pentapolyphosphoric acid, hexapolyphosphoric acid, heptapolyphosphoric acid, and so on to increasingly longer-chain polyphosphoric acids. Further cyclic polymers utilizing the so-called metaphosphoric acid ($HPO_3$) unit are also produced under certain conditions.

Aqueous solutions having less than 68% $P_2O_5$ generally contain only orthophosphoric acid. As the $P_2O_5$ content increases beyond 68% to higher and higher concentrations in the aqueous solution, pyrophosphoric acid and then tripolyphosphoric and other polyphosphoric acids begin to appear. As $P_2O_5$ concentrations in excess of about 68%, the condensation of orthophosphoric acid to produce pyrophosphoric acid and the polyphosphoric acids follows a pattern as set forth, for example, in J. R. Van Wazer, Phosphorus and Its Compounds, vol. I, 1958. New York, Interscience. The liquid phosphoric acids of a given $H_2O/P_2O_5$ mole ratio appear to exhibit the same molecular composition regardless of their method of preparation and previous thermal history. See for example Van Wazer, supra, at pages 747–748 for the distribution of the several phosphoric acids at higher $P_2O_5$ contents.

A number of commercial processes for producing phosphoric acid are known. Two commercial methods in current use are the wet-process method and the electric furnace method. In the wet-process method the bone ash or ground phosphate rock is dissolved with a dilute mineral acid, commonly sulfuric acid; the calcium ions are then removed in the form of a calcium salt; and the weak orthophosphoric solution is heated so as to concentrate it by evaporation.

The electric furnace process prepares phosphoric acid from phosphatic mineral materials by producing the pure element, burning the phosphorus so obtained to produce phosphorus pentoxide, and dissolving the phosphoric pentoxide in water to produce the desired concentration of $P_2O_5$ in water. Thus, the electric furnace process can make phosphoric acid having high purity.

The wet-process is considerably less expensive in most areas than the electric furnace process, but it produces phosphoric acid containing mineral impurities which are not readily removed from the acid. These impurities are chiefly calcium, aluminum, iron, silicon, magnesium, and fluorine, which occur in combination with the phosphate rock. The chief constituents of phosphate rock are generally apatite, $3Ca_3(PO_4)_2 \cdot CaF_2$, and/or calcium phosphate, $Ca_3PO_4$. The wet process generally produces relatively weak phosphoric acids containing about 28–36% $P_2O_5$.

One of the most important commercial uses of high $P_2O_5$ content acids, that is those containing more than about 68% $P_2O_5$, is in the preparation of fertilizers, and more particularly, of the liquid fertilizers which have come recently into such wide use because of the economy of their transportation and application. The acids heretofore produce, either by the electric furnace or the wet processes, have contained relatively large quantities of orthophosphoric acid and pyrophosphoric acid at $P_2O_5$ contents in the range of 70–80% and small quantities of the tripolyphosphoric and higher phosphoric acids. When the acid is produced by the wet process, it contains a quantity of impurities, as pointed out above, and when liquid fertilizers are to be prepared no solid materials can be tolerated in the fertilizer solution. If such solid materials are present, they tend to collect in and to block the orifices, valves, and nozzles used to apply the liquid fertilizer to the soil. This results in costly and intolerable shut-downs in the field. Moreover, if the phosphoric acid is to be ammoniated to produce solid fertilizers, the presence of solid precipitates complicates and hampers the ammoniation process.

To obviate any formation of solids in the fertilizer solution prepared from wet-process acids, it is desirable to suspend or chelate any solid-forming impurities. Orthophosphoric acid, while generally satisfactory from the point of view of phosphorus content in the fertilizer, has little or no chelating power. Pyrophosphoric acid is a good chelating agent for divalent ions and tripolyphosphoric acid is an excellent chelating agent for trivalent and higher valent ions. Because most of the undesirable impurities present in wet process acid and the minor trace elements desired to be incorporated in fertilizers made from such acids have a valence of three or more, it is particularly advantageous to have a phosphoric acid composition in which the proportion of acid present as tripolyphosphoric acid is maximized. In prior art processes, pyrophosphoric and tripolyphosphoric acids do not generally appear in large quantities until a $P_2O_5$ content of about 80% or greater is reached.

As pointed out above, wet-process phosphoric acid is generally obtained with a $P_2O_5$ content of 28–36%. Concentration processes are known for increasing the amount of $P_2O_5$ in the acid up to about 65–68%. For liquid fertilizer and other uses, it is desirable to increase the $P_2O_5$ content beyond 68%, but the problems involved in concentrating wet-process phosphoric acid beyond 68% IFB are considerably more severe than are those involved in concentrating the acid to about that strength. Some of the problems involved are higher temperatures, more severe corrosion, and extensive scale formation on heat transfer surfaces. Moreover, there is a tendency for the hot concentrated acid to form insoluble polyphosphoric and metaphosphoric acids.

One of the techniques useful for producing wet-process phosphoric acids having $P_2O_5$ contents in excess of 68% is the submerged combustion process. In this process a nozzle is inserted into the acid to be concentrated, and the hot gases formed by burning a flame are passed directly into the acid. Such a submerged combustion process is very efficient in the use of heat, but it also creates problems in the preparation of liquid fertilizer base materials by tending to form quantities of insoluble phosphoric acids such as metaphosphoric and the very high polyphosphoric acids.

This invention provides high $P_2O_5$ content liquid phosphoric acids which exhibit unexpectedly high conversions of orthophosphoric acid to higher or condensed phosphoric acids.

This invention also provides a novel process for the production of high $P_2O_5$ content liquid wet-process phosphoric acids which have high conversion of orthophosphoric acid to condensed phosphoric acids.

This invention further provides novel fertilizer compositions.

Further and more specific objects, features, and advantages will clearly appear from the detailed description given below taken in connection with the accompanying drawings which form a part of this specification.

Briefly, the phosphoric acids of this invention are liquids which contain from about 72 to about 79% $P_2O_5$ IFB, the $P_2O_5$ being distributed so that from about 22 to about 65% is in the form of orthophosphoric acid, not more than about 44% is in the form of pyrophosphoric acid, and the percentage of $P_2O_5$ in the form of tripolyphosphoric acid is not less than the quantity:

$$[(2.08 \times IFB\% \ P_2O_5) - 146.4]$$

Moreover, the phosphoric acids of this invention have at least a certain ratio of tripolyphosphoric acid to pyrophosphoric acid.

The process of this invention is a continuous one which comprises passing a phosphoric acid into a submerged combustion zone which is capable of evaporating water, dividing the acid into two or more portions, directly contacting at least one portion with hot gaseous combustion products, heating the remaining portion or portions, withdrawing water vapor, and subsequently combining the portions and withdrawing them from the evaporation zone. A submerged combustion zone is a zone in which hot gaseous combustion products directly contact a fluid which is to be heated and/or reduced in solvent content.

The liquid fertilizer concentrate produced according to this invention preferably contains at least about 30% but not more than about 44% ammonium pyrophosphate, from about 22 to about 65% ammonium orthophosphate, and at least about 12% ammonium tripolyphosphate when the amount of ammonium orthophosphate is less than about 40%. The total ammonium phosphate content preferably does not exceed 79%. It will be understood that all of the ingredients in this liquid fertilizer concentrate are also calculated on an impurity-free basis, that is, they are inclusive only of the ammonia, phosphate, and water.

The invention comprises the novel compositions and component mixtures comprised in such compositions, as well as the novel processes and steps of processes according to which such compositions may be manufactured, specific embodiments of which are described hereinafter by way of example only and in accordance with what is now considered to be the preferred manner of practicing the invention.

In the accompanying drawings which form a part of this specification:

FIGURE 1 is a graphical comparison of the wet-process phosphoric acids of this invention with the phosphoric acids heretofore known, and FIGURE 2 is a schematic diagram of an embodiment of the process of this invention.

In FIGURE 1 the curves formed by the solid lines represent the concentrations of the indicated acids, as a percentage of the total acids, plotted as a function of the total $P_2O_5$ IFB for the compositions of this invention. The curves formed by the broken lines show similar information for the Van Wazer, supra, compositions. A study of FIGURE 1 discloses the unexpected fact that, for $P_2O_5$ concentrations of up to 79%, a much higher proportion of orthophosphoric acid is converted to higher phosphoric acids, and especially the preferred pyro- and tripolyphosphoric acids, than has been known in, or would be predicted in view of, the prior art. This is especially surprising in that it has heretofore been thought that liquid phosphoric acids of a given $H_2O/P_2O_5$ molar ratio invariably exhibited the same molecular composition regardless of their mode of preparation or previous thermal history.

It will be understood herein that the term phosphoric acid has reference to any substance or composition which can be regarded as a mixture of $H_2O$ and $P_2O_5$. In other words, it is a generic term which covers orthophosphoric acid in dilute solute solution or in concentrated form, as well as pyrophosphoric acid and the polyphosphoric acids. Where the term condensed or higher acid, or phosphoric acid, is used herein, it shall be taken to mean an acid produced by condensation of one or more moles of orthophosphric acid with the elimination of water and includes pyrophosphoric acid and the polyphosphoric acids. It will be understood that the term polyphosphoric acid includes all acids which may be regarded as derivable by the condensation of one or more moles of orthophosphoric acid with a mole of pyrophosphoric acid. Examples of polyphosphoric acid are tripolyphosphoric, tetrapolyphosphoric, pentapolyphosphoric, hexapolyphosphoric, and the like.

The liquid compositions of this invention preferably must contain at least about 72% $P_2O_5$ to ensure that significant amounts of the orthophosphoric acid have been converted to higher phosphoric acid. Since a liquid of reasonable viscosity and capable of being pumped and otherwise handled with facility so as to be suitable for use as or in the preparation of a fertilizer is desired, the $P_2O_5$ content should not be above about 79%. Accordingly, the preferred range of phosphorus pentoxide content is from about 72% to about 79%. It is preferred that, at $P_2O_5$ concentrations of 75% or more, the amount of $P_2O_5$ in the form of tripolyphosphoric acid be at least 12%.

To obtain the maximum chelating power, it is preferred that substantial quantities of tripolyphosphoric acid be present in the liquid phosphoric acid. The amount of $P_2O_5$ in the form of tripolyphosphoric acid is preferably in excess of the amount determined according to the formula: percent $P_2O_5$ in form of tripolyphosphoric acid=(2.08×percent $P_2O_5$)−146.4. This assures that there will be sufficient tripolyphosphoric acid present to suspend impurities in the wet-process acid.

In order to assure that sufficient conversion of orthophosphoric acid to higher phosphoric acids has taken place, the quantity of orthophosphoric acid present in the product of the invention should be between about 22% and about 65%. Further to maintain the polyphosphoric acids at appreciable levels as higher $P_2O_5$ contents are used, the amount of pyrophosphoric acid present should preferably not exceed about 44%. Accordingly, one liquid phosphoric acid composition of this invention contains for about 75 to about 79% $P_2O_5$, less than about 65% orthophosphoric acid and less than about 44% pyrophosphoric acid, and when the orthophosphoric acid content is less than about 40%, it contains more than about 12% of tripolyphosphoric acid.

The foregoing composition has superior properties to prior art compositions contain 72% or more $P_2O_5$. For maximum chelating power to suspend solids or otherwise to maintain them in solution and to ensure that the phosphoric acid remains as a liquid, it is greatly preferred that in excess of about 12% of the total $P_2O_5$ be in the form of tripolyphosphoric acid. Accordingly, a greatly preferred composition of this invention comprises a liquid phosphoric acid having a $P_2O_5$ content of from about 75 to about 79% with at least about 12% of the $P_2O_5$ being in the form of tripolyphosphoric acid, from about 23% to about 40% being in the form of orthophosphoric acid, and from about 40% to about 44% being in the form of pyrophosphoric acid.

To assume maximum chelating power in the acids of this invention it is further preferred that they contain from about 72 to about 79% $P_2O_5$, from about 22 to about 65% of the $P_2O_5$ being in the form of orthophosphoric acid and that the ratio, R, of tripolyphosphoric acid to pyrophosphoric acid not be less than that determined by the formula:

$$R = 0.0571 \text{ (percent } P_2O_5) - 4.014$$

It will be understood that the amounts of the several phosphoric acids in a mixture are conveniently determined by known chemical techniques. One of the best present techniques for distinguishing and quantitatively determining the various phosphoric acids present in a mixture is by paper chromatographic techniques. Such a technique is shown in the Huhti et al. article in the Canadian Journal of Chemistry, volume 34, page 785 et seq. (1956) and in Analytical Chemistry, volume 36, page 1693 et seq. (1964).

Production of the novel liquid phosphoric acids of this invention is made possible by the method of this inventon, one embodiment of which is described hereinbelow in connection with FIGURE 2. The apparatus represented in FIGURE 2 comprises dip tube 10 in evaporator chamber 11. A circular well 12 is formed in the bottom of the evaporator chamber 11 by walls 13 which are tapered upwardly from the bottom of the well. In the apparatus diagrammed in FIGURE 2 the walls 13 form an acute angle with the vertical at the bottom of the wall and a less acute angle at the upper portion of the well. The phosphoric acid to be concentrated is fed into the evaporator chamber through pipe 14. For clarity in the figure, the level of the phosphoric acid is not shown, but the general direction of its flow in the evaporation zone is indicated by arrows. Circular plate 16 can be used below the orifice of dip tube 10.

Into the top (not shown in FIGURE 2) of dip tube 10 is passed a fuel, preferably a hydrocarbon fuel such as natural gas or atomized fuel oil. The fuel is mixed with a sufficient quantity of air (primary air) to ensure its ignition and passed to a combustion zone. The fuel-air mixture is ignited in the combustion zone by a suitable means such as an electric-spark, and additional air (secondary air) is fed to the combustion zone so that the fuel is essentially completely consumed to form hot gaseous combustion products.

These hot gaseous combustion products pass downwardly to the bottom of dip tube 10 and emanate therefrom. Some of the phosphoric acid feed is lifted by the pumping action of the hot gaseous combustion products emanating from the bottom of dip tube 10 and is carried up between shroud 17 disposed coaxially to dip tube 10 and the dip tube. The shroud is so designed and spaced from the inside walls of the evaporator and external walls of the dip tube so as to create a lifting action by means of the hot combustion gases. In this way a portion of the phosphoric acid is carried up between the annular space defined by shroud 17 and dip tube 10. For example, in one preferred arrangement shroud 17 has a length of 19 inches and upper and lower diameter of 42 inches and 33 inches respectively. The lower end is positioned about 2 inches below the plane of the dip tube orifice and about 2 inches above the floor of the evaporator chamber. The acid pool in the chamber has a height of from 10–14 inches. Generally, the height of the acid pool in the evaporator chamber will depend on a variety of factors, including the acid feed rate, the volume of combustion products, the end product desired, and the shroud dimensions and design. The phosphoric acid carried with the hot gaseous combustion products is drawn to the top of shroud 17 where the gases escape and pass out of chamber 11 via duct 18. The acid which has been contacted directly by the hot gases overflows at the top of shroud 17 and passes downwardly in the space defined by the outside wall of shroud 17 and walls 13. At the bottom of shroud 17, some of the heated phosphoric acid which has previously contacted the hot gases is again drawn into the annular space between dip tube 10 and shroud 17 together with a portion of fresh acid and recycled. The remainder of the phosphoric acid falling downwardly between shroud 17 and walls 13 mixes with and thereby heats the incoming phosphoric acid, some of which in turn passes in direct contact with the hot gaseous combustion products through the annular space between the shroud and dip tube and the remainder of which passes out from the evaporator chamber through pipe 19.

The heated phosphoric acid in chamber 11 evolves water vapor and thereby becomes more concentrated. In addition to water vapor, other materials, typically phosphorus pentoxide, sulfur oxides, and fluorine compounds, pass out from chamber 11 to duct 18. Since many of the materials which pass up the ducts are noxious, the effluent gases are treated to remove noxious materials and to return substantial quantities of $P_2O_5$ to the process with consequent enhanced economy and safety of operation.

The wet-process phosphoric acid fed to chamber 11 should preferably comprise from about 50 to about 68% $P_2O_5$. While the $P_2O_5$ content of wet-process acid usually ranges from about 25 to about 32% $P_2O_5$, it is generally more economical to concentrate this material to the range of 50–60% $P_2O_5$ before treating it according to the process of this invention. Below about 50% $P_2O_5$, it is more economical to concentrate the acid by other means; while above 68% $P_2O_5$, it is difficult efficiently to concentrate the acid by other processes for the reasons pointed out above.

The greatest economies in the operation with the process of this invention can be effected with a wet-process phosphoric acid feed containing from about 53% to about 60% $P_2O_5$, and preferably on the order of about 55% $P_2O_5$. It will be understood that the wet-process acid treated according to the process of this invention has been previously lowered in calcium content by conventional methods, so that there is a reduced quantity of calcium present.

It is preferred that relatively high temperatures be utilized in practicing this invention. The temperatures will generally lie in the range of from about 450° to about 800° F. Below this temperature insufficient water vapor is removed and excessive equipment sizes are required, whereas at higher temperatures greater amounts of $P_2O_5$ are driven off, and this necessitates tedious and expensive recovery procedures to obtain the $P_2O_5$ values.

The process of this invention can of course be used to concentrate phosphoric acid to any $P_2O_5$ concentration higher than the $P_2O_5$ concentration of the feed acid. Generally, it is preferred to use the process to increase the $P_2O_5$ content of wet-process phosphoric acids to concentrations in excess of 70%. It will be understood that concentrations of $P_2O_5$ well in excess of 80% can be prepared with the process of this invention. As can be appreciated from FIGURE 1, higher polyphosphoric acid contents and/or higher conversion of orthophosphoric acid to higher phosphoric acids can be achieved for $P_2O_5$ contents from about 70% up to and beyond 82% $P_2O_5$.

Because of the particularly advantageous chelating properties of tripolyphosphoric acid, it is preferred to use the process of this invention to concentrate wet-process phosphoric acids so as to produce a $P_2O_5$ content of from about 72% to about 79%. Where a tripolyphosphoric acid content in excess of about 12% is desired, it is preferred that the process of this invention produce a final $P_2O_5$ content in the range of from about 75 to about 79% $P_2O_5$.

It will be understood that the final $P_2O_5$ concentration can readily be maintained at a desired value by control of the process parameters: the phosphoric acid feed and withdrawal rates, the feed $P_2O_5$ content, the temperature of the acid in the evaporation zone, and control of the thermal energy input to the process. The amount of thermal energy or heat which is used to evaporate a suitable quantity of water from the acid in the evaporation zone is determined by the quantity of fuel fed to the combustion chamber which comprises the upper portion of dip tube 10. It will be appreciated by those skilled in the art that the foregoing process parameters can be varied within limits, but that they are interrelated so that in practice they are varied to obtain the final $P_2O_5$ content which is desired. For example, when the retention time of the phosphoric acid in the evaporation zone is shortened by increasing the feed and/or withdrawal rates, the degree of concentration at a given temperature is reduced. A reduction in the quantity of heat input to the process has a like effect. A higher temperature at a given dwell time in the evaporation zone will generally produce a higher concentration of $P_2O_5$ in the final product withdrawn from the zone.

From the foregoing disclosure respecting the process of this invention, it will be apparent to those skilled in the art that equipment arrangements for the submerged combustion concentration process can be varied from those shown in FIGURE 2. The process provides intimate contact of the feed acid to be concentrated with the hot gaseous combustion products and rapid heat transfer from the gases to the feed acid for at least a portion of the acid fed to the evaporation zone. In some instances substantially all the acid is carried into direct contact with the hot gases. In such cases some portion of the acid is in such contact for a longer period than the remainder. Preferably, a portion of the phosphoric acid fed to the submerged combustion evaporation zone does not directly contact the hot gaseous combustion products, but rather heat is transferred to this portion of the acid by conduction and convection from the portion which has contacted, and been directly heated by, the hot gases.

The contact time of the gases with the respective portion of the feed acid is relatively short and the average retention time of the acid in the evaporation zone is likewise relatively short. It is preferred that the retention time be long enough to raise the temperature of the feed phosphoric acid to evaporate the required amount of water and produce the desired $P_2O_5$ concentration in the product acid, but that the acid not remain in the evaporation zone sufficiently long that most or all of it is contacted by the hot gases. Some of the acid will be in the zone longer than the average retention time and some will be in the zone for a shorter time. Generally, the retention time will depend upon such factors as the purity of the feed acid, the concentration of $P_2O_5$ in the feed acid, the concentration of $P_2O_5$ in the end product desired, and the efficiency of the gaseous effluent scrubbing system. With typical commercial grades of wet-process acid available in the United States of America having a concentration of $P_2O_5$ of about 55%, the retention time would vary from about 30 seconds to 12 minutes and preferably from about 1 to 5 minutes. In order to avoid formation of insoluble materials, the retention time should be held to the minimum consistent with effective operation and, more particularly, the retention time should be reduced as the concentration of $P_2O_5$ in the end product desired is increased.

As used herein, the average retention time, T, is determined according to the expression:

$$T = \frac{\text{pool volume (gal.)} \times \text{specific gravity of product acid} \times \text{concentration of product acid}}{\text{feed rate (gal./min.)} \times \text{specific gravity of feed acid} \times \text{concentration of feed acid}}$$

In the foregoing, the term "concentration of acid" is taken to mean the concentration of $P_2O_5$.

The specific gravity of the feed acid taken at the feed temperature will vary according to its $P_2O_5$ concentration. The specific gravity of the product is taken at operating temperature and can be taken to be constant at 1.5 in the determination of retention-time because at the temperatures in the evaporator there is little change in specific gravity for acids containing from about 70–80% $P_2O_5$. Thus, where a 55% $P_2O_5$ feed acid is used in the process, to produce a 79% acid, the equation for determination of retention time reduces to $$T = 1.22 \times \frac{\text{pool volume (gal.)}}{\text{feed rate (gal./min.)}}$$

It will further be apparent from this disclosure that other baffling or shrouding arrangements can be utilized in the practice of this process. For example, a multiple-pass shroud arrangement can be used so that the combustion gas and phosphoric acid entrained therewith pass through a tortuous or circuitous route, instead of the gas merely being carried upward in the annular space between the shroud and dip tube, subsequent to the escape of the gas into the head space of the evaporation chamber. In another equipment arrangement, deflector plates can be used on the shroud so that the necessary mixture of feed acid with material which has been in direct contact with the flue gas will take place. Some of the feed material should be forced to bypass the shroud so that all of the feed does not directly contact the hot gaseous combustion products. The shroud can also be perforated with holes having the same dimension or different dimensions to assist heating, agitation, and circulation of acid within the zone.

Multiple-dip tube arrangements can also be used, although it is preferred for convenience in maintaining and controlling combustion to use a single large dip tube having the required heat input for the desired production rate. Various burner arrangements can be utilized, depending upon the particular fuel used to produce the hot gases, and the combustion means and equipment for generating the heat gases are well-known in the art. The embodiment of FIGURE 2 shows the inlet and discharge pipes disposed at opposite sides of the evaporation chamber, but it will be understood that alternative arrangements can be utilized. For example, the intake and discharge pipes can be disposed in the same wall, at right angles to each other in their horizontal plane, or at any other desired angle. Moreover, a plurality of intake and/or discharge pipes can be utilized.

As stated above, the phosphoric acids of, and produced by the process of, this invention are liquids and are especially suited to use as, and in the production of, liquid fertilizer concentrates. As used herein, liquid fertilizer concentrates is taken to mean materials which can be used directly as fertilizers or which can be admixed with other agricultural nutrient materials to produce liquid fertilizer compositions so as to be tailored to the conditions prevailing in a given soil.

In order to produce a more useful and more highly concentrated liquid fertilizer composition, it is preferred that the phosphoric acid of this invention be neutralized with ammonia. While the ammonia can be added in the form of ammonium hydroxide, it is preferred that anhydrous ammonia gas be passed directly into the concentrated liquid phosphoric acid of this invention. Regardless of how the ammoniation is accomplished, the liquid fertilizer concentrate will be found to have superior properties due to its unique conversion of orthophosphoric acid to the higher phosphoric acids. Such conversion enables the production of a liquid material which will chelate and keep in solution or suspension solids which would otherwise precipitate from a wet-process phosphoric acid and render its use as a liquid fertilizer difficult or impossible.

In a preferred method of preparing liquid fertilizers from the phosphoric acids of this invention, a fertilizer concentrate solution of the desired composition is placed in a tank. Anhydrous ammonia and phosphoric acid are fed to the tank in proportions and at a rate to maintain the specific gravity of the fertilizer concentrate solution to a certain range and the pH of the solution in a range of about 6.1–6.3. Thus, where a 10–34–0 fertilizer concentrate solution is being prepared, the specific gravity is maintained at 1.38; while for an 11–37–0 solution the gravity is maintained at 1.48.

It will be understood that the ammoniation of the phosphoric acid can be carried out either batchwise or continuously. In general, it is preferred to carry out the concentrate preparation so as to minimize the hold time of solution in the tank. The time is preferably less than about 20 minutes to avoid hydrolysis of higher phosphate back to orthophosphates. With the acids of this invention, only 2–3% hydrolysis takes place at temperatures of 220° F.

The advantages of the concentrate of this invention are that they have a high total pyro- and tripolyphosphate content and the ability to hold quantities of additional materials, both their own impurities and additives which are used in compounding fertilizers for specific uses, in solution or suspension. Moreover, this ability is attained at lower total $P_2O_5$ contents than previously possible. This represents a distinct economic advantage in that the desired results can be obtained even though lesser quantities of water are removed. Further, the ammonium phosphate concentrates produced according to this invention will not salt out at extremes of temperature.

Additionally, if it is desired to prepare dry or solid fertilizers from the ammonium phosphates of this invention, still other advantages become manifest. The dried material prepared with the acids of this invention is relatively non-hygroscopic and easy to handle. There is little or no aggregation of individual particles, even when a high concentration of nutrients is incorporated. With the lack of aggregation and comparative freedom from hygroscopicity, the material is free-flowing. Solid ammonium phosphate fertilizers produced from the acids of this invention are further advantageous in that they are capable of providing a high total plant nutrient content and they are sparingly soluble so that the nutrients are released over an extended period of time, with the result that one initial application or only a few applications to the soil are necessary to maintain plant growth throughout a season.

Where a higher ratio of nitrogen to phosphorus ($N/P_2O_5$) is desired, supplementary nitrogen can readily be added. This additional nitrogen can be added in the form of high nitrogen-content materials such as urea or ammonium nitrate. When such supplemental nitrogen is added to solid fertilizers prepared from the phosphoric acids of this invention, yet another advantage becomes apparent. The addition of nitrogen sources to conventional fertilizers tends to "deblend" them so that a heterogeneous mixture of discrete particles results. In the solid fertilizers produced from the acids of this invention the supplemental nitrogenous materials are readily blended homogeneously. This is believed to be due to the fact that the fertilizers of this invention are still in a plastic condition and form a glass-like substance instead of crystallizing.

It is preferred to prepare the ammonium phosphate fertilizers of this invention by reacting the liquid phosphoric acid of this invention which contains at least about 72% $P_2O_5$ with anhydrous ammonia. If sufficient ammonia is added at high $P_2O_5$ contents, a solid product may be obtained. Such a resultant solid ammonium phosphate product can be marketed as such or can be dissolved in water to form an aqueous composition. It is desirable at high $P_2O_5$ contents to maintain the phosphoric acid at a relatively high temperature on the order of about 300–450° F. during the ammoniation to maintain the reaction mixture as a liquid.

The quantity of ammonia which is added to the material depends upon the end product desired and the other ingredients which are to be added to the fertilizer concentrate. However, with the phosphoric acids of this invention it is preferred in order to take advantage of their sequestering properties and the decreased toxicity, and increased solubility of fertilizers made therefrom, to produce liquid fertilizers of 11-37-0, 10-34-0, and 13-39-0 type, in which case about 4 moles of $NH_3$ for each molar quantity of $P_2O_5$ in the acid is used. Solid fertilizers of the 33-57-0 type require about 7 moles of $NH_3$ per molar quantity of $P_2O_5$ and can be produced at elevated pressure, for example pressures in excess of 150 p.s.i. Other solid fertilizers containing high plant nutrient values can be made with from about 3 to 7 moles of $NH_3$ per molar quantity of $P_2O_5$ in the acid.

Solid ammonium phosphate fertilizers can be produced from the phosphoric acids of this invention by admixing the phosphoric acid with other known fertilizer ingredients, such as sulfuric acid, ammonium phosphate, ammonium nitrate, urea, other condensed phosphates, potassium salts, and the like, to name a few. Where a solid reaction product is produced it can be transferred to a cooling and drying zone to contact it with cool, low-humidity air. Subsequently the solid material can be crushed and screened to produce the desired particle size distribution.

The following examples will serve only to illustrate the invention more fully, and accordingly, they are not to be considered as limiting the scope of the invention.

Example I

A phosphoric acid containing 58.32% (non-IFB) $P_2O_5$ and 0.4% solids is fed to an evaporation zone at the rate of 19 gal./min. The dip tube is supplied with 182 standard cubic feet/min. (s.c.f.m.) of fuel gas having a heat of combustion of 1040 B.t.u./ft.$^3$, 2290 s.c.f.m. primary air, and 360 s.c.f.m. secondary air to provide 46% excess air. The pool liquid height in the evaporator well is ten inches, and the dip tube is immersed in the pool to a depth of six inches. The vertical height to the top of the shroud from the surface of the acid pool in the evaporator is 11 inches. The pool contains an average of 38 gallons of acid and the average retention time of acid in the 600° F. pool is 2.1 minutes.

The product continuously withdrawn from the pool contains 72.69% (non-IFB) $P_2O_5$ and 25.82% of the $P_2O_5$ is in the orthophosphoric acid form. Thus, the conversion of orthophosphoric acid to higher phosphoric acids is 74.18. As used herein, the term conversion of orthophosphoric acid is taken to be 100 times the quotient of the total $P_2O_5$ less the $P_2O_5$ attributable to the orthophosphoric acid divided by the total $P_2O_5$.

Upon analysis the IFB $P_2O_5$ is found to be 75.0%, the amount of pyrophosphoric acid is about 43%, the amount of tripolyphosphoric acid is about 14%, and the remainder of the $P_2O_5$ is chiefly in the form of tetrapolyphosphoric acid and pentapolyphosphoric acid.

The phosphoric acid so prepared is neutralized with anhydrous ammonia to produce an 11-37-0 liquid fertilizer concentrate composition which is stable against reversion and temperature extremes.

Example II

A phosphoric acid containing 57.29% (non-IFB) $P_2O_5$ and 0.4% solids is fed to an evaporation zone at the rate of 22 gal./min. The dip tube is supplied with 203 standard cubic feet/min. (s.c.f.m.) of fuel gas having a heat of combustion of about 1040 B.t.u./ft.$^3$, 2550 s.c.f.m. primary air, and 400 s.c.f.m. secondary air to provide 45% excess air. The pool liquid height in the evaporator well is 10 inches, and the dip tube is immersed in the pool to a depth of 6 inches. The evaporator used is the same as that used in Example I and the pool contains an average of 38 gallons of acid. The average retention time of the acid in the 500° F. pool is 1.8 minutes.

The product continuously withdrawn from the pool contains 69.1% (non-IFB) $P_2O_5$ and 46.6% of the $P_2O_5$ is in the form of orthophosphoric acid. Thus, the conversion of orthophosphoric acid to higher phosphoric acids is 53.4%.

Upon analysis the IFB $P_2O_5$ is found to be 72.0%, the amount of pyrophosphoric acid is about 29%, and the remainder of the $P_2O_5$, namely about 4%, is chiefly in the form of tripolyphosphoric acid.

Example III

A phosphoric acid containing 57.29% (non-IFB) $P_2O_5$ and 0.4% solids is fed to an evaporation zone at the rate of 20 gal./min. The dip tube is supplied with 237 s.c.f.m. of fuel gas having a heat of combustion of about 1040 B.t.u./ft.$^3$, 2980 s.c.f.m. primary air, and 470 s.c.f.m. secondary air to provide 45% excess air. The apparatus and pool liquid height are as set forth in Example I, and the average retention time of acid in the 650° F. pool is 2.2 minutes.

The product continuously withdrawn from the pool contains 75.5% (non-IFB) $P_2O_5$ and 17.5% of the $P_2O_5$ is in the form of orthophosphoric acid. Thus, the conversion of orthophosphoric acid to higher phosphoric acids is 82.5%.

Upon analysis the IFB $P_2O_5$ is found to be 78.6%, the amount of pyrophosphoric acid is about 37%, the amount of tripolyphosphoric acid is about 21%, the amount of tetrapolyphosphoric acid is about 12%, the amount of pentapolyphosphoric acid is about 5%, and the remainder of the $P_2O_5$ is chiefly in the form of hexapolyphosphoric acid.

What is claimed is:

1. A liquid phosphoric acid which contains from about 72% to about 79% (IFB) $P_2O_5$, the distribution of $P_2O_5$ being such that from about 22% to about 65% of the $P_2O_5$ is in the form of orthophosphoric acid and not more than about 44% is in the form of pyrophosphoric acid, the percentage of $P_2O_5$ in the form of tripolyphosphoric acid being not less than the quantity $$[(2.08 \times IFB\% \; P_2O_5) - 146.4]$$

2. A liquid phosphoric acid which contains from about 72% to about 79% $P_2O_5$, the distribution of (IFB) $P_2O_5$ being such that from about 22% to about 65% of the $P_2O_5$ is in the form of orthophosphoric acid and the ratio R of tripolyphosphoric acid to pyrophosphoric acid being not less than $[(0.0571 \times IFB\% \; P_2O_5) - 4.014]$.

3. A liquid phosphoric acid which contains from about 72% to about 79% (IFB) $P_2O_5$, the distribution of $P_2O_5$ being such that from about 22% to about 65% of the $P_2O_5$ is in the form of orthophosphoric acid and not more than about 44% is in the form of pyrophosphoric acid, the percentage of $P_2O_5$ in the form of tripolyphosphoric acid being not less than the quantity $$[(2.08 \times IFB\% \; P_2O_5) - 146.4]$$

and the ratio R of tripolyphosphoric acid to pyrophosphoric acid being not less than $$[(0.0571 \times IFB\% \; P_2O_5) - 4.014]$$

4. A liquid phosphoric acid which contains on an impurity free basis from about 75 to about 79% (IFB) $P_2O_5$, the distribution of $P_2O_5$ being such that from about 23% to about 65% is in the form of orthophosphoric acid, less than about 44% is in the form of pyrophosphoric acid, and the percentage of $P_2O_5$ in the form of tripolyphosphoric acid is not less than $$[(2.08 \times percent \; P_2O_5) - 146.4]$$

5. A liquid phosphoric acid which contains on an impurity free basis from about 75 to about 79% (IFB) $P_2O_5$, the distribution of $P_2O_5$ being such that from about 23 to about 40% is in the form of orthophosphoric acid, from about 40 to about 44% is in the form of pyrophosphoric acid, and the percentage of $P_2O_5$ in the form of tripolyphosphoric acid is not less than $$[(2.08 \times percent \; P_2O_5) - 146.4]$$

6. A liquid phosphoric acid which contains from about 75% to about 79 IFB% $P_2O_5$, the distribution of $P_2O_5$ being such that from about 22% to about 65% is in the form of orthophosphoric acid, from about 38% to about 44% is in the form of pyrophosphoric acid, and more than about 12% is in the form of tripolyphosphoric acid.

References Cited

UNITED STATES PATENTS

| | | | |
|---|---|---|---|
| 3,264,085 | 8/1966 | Hignett et al. | 23—165 X |
| 3,317,306 | 5/1967 | Getsinger et al. | 23—165 X |
| 3,325,244 | 6/1967 | Copson | 23—165 X |

OTHER REFERENCES

Woodis, Analytical Chem., vol. 36, July 1964, pp. 1682 and 1683.

OSCAR R. VERTIZ, *Primary Examiner.*

ARTHUR GREIF, *Assistant Examiner.*

U.S. Cl. X.R.

71—34; 159—47

PO-1050
(5/69)

UNITED STATES PATENT OFFICE
CERTIFICATE OF CORRECTION

Patent No. 3,453,074          Dated    July 1, 1969

Inventor(s)    WILLIAM R. MUSTIAN, JR.

It is certified that error appears in the above-identified patent and that said Letters Patent are hereby corrected as shown below:

In the Specification:
    Column 2, line 26, "As" should read --At--.
    Column 2, line 64, after "containing" and before "about", insert --from--.
    Column 5, line 6, correct the spelling of "orthophosphoric acid".
    Column 5, line 52, "contain" should read --containing--.
    Column 5, line 65, "assume" should read --assure--.
    Column 6, line 19, "wall" should read --well--.
    Column 11, line 44, add --%-- after "74.18".

In the Claims:
    Claim 2, line 2, strike "(IFB)" after "of", and insert --(IFB)-- after "79%" and before "$P_2O_5$".

SIGNED AND
SEALED
MAR 17 1970

(SEAL)
Attest:

Edward M. Fletcher, Jr.
Attesting Officer

WILLIAM E. SCHUYLER, JR.
Commissioner of Patents